United States Patent
Chapman

(10) Patent No.: US 7,373,364 B1
(45) Date of Patent: May 13, 2008

(54) SYSTEM AND METHOD FOR CREATING A POINT-IN-TIME RESTORATION OF A DATABASE FILE

(75) Inventor: Dennis E. Chapman, Ben Lomond, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 437 days.

(21) Appl. No.: 10/090,963

(22) Filed: Mar. 5, 2002

(51) Int. Cl.
*G06F 12/00* (2006.01)
*G06F 17/30* (2006.01)

(52) U.S. Cl. .............. 707/204; 707/200; 707/201; 707/202; 707/203

(58) Field of Classification Search ............ 707/201, 707/202–204
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A * | 10/1998 | Hitz et al. | 707/203 |
| 5,835,953 A * | 11/1998 | Ohran | 711/162 |
| 5,931,918 A | 8/1999 | Row et al. | |
| 5,941,972 A | 8/1999 | Hoese et al. | |
| 6,065,037 A | 5/2000 | Hitz et al. | |
| 6,173,293 B1 * | 1/2001 | Thekkath et al. | 707/201 |
| 6,212,531 B1 * | 4/2001 | Blea et al. | 707/204 |
| 6,311,193 B1 * | 10/2001 | Sekido | 707/202 |
| 6,425,035 B2 | 7/2002 | Hoese et al. | |
| 6,453,325 B1 * | 9/2002 | Cabrera et al. | 707/204 |
| 6,611,850 B1 * | 8/2003 | Shen | 707/204 |
| 6,636,878 B1 * | 10/2003 | Rudoff | 707/204 |
| 6,643,654 B1 * | 11/2003 | Patel et al. | 707/10 |
| 6,665,815 B1 * | 12/2003 | Goldstein et al. | 714/20 |
| 6,675,177 B1 * | 1/2004 | Webb | 707/200 |
| 6,691,245 B1 * | 2/2004 | DeKoning | 714/6 |
| 6,704,885 B1 * | 3/2004 | Salas-Meza et al. | 714/6 |
| 6,721,764 B2 * | 4/2004 | Hitz et al. | 707/202 |
| 6,748,504 B2 * | 6/2004 | Sawdon et al. | 711/162 |
| 6,785,786 B1 * | 8/2004 | Gold et al. | 711/162 |

(Continued)

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner*—Apu Mofiz
*Assistant Examiner*—Cindy Nguyen
(74) *Attorney, Agent, or Firm*—Cesari and McKenna LLP

(57) ABSTRACT

The present invention provides a method for generating a point-in-time restoration of database files and associated log files by utilizing a snapshot feature of the file system storing the files. At regular intervals, snapshots, which produce read-only copies of the files, are taken along with backups of the associated log files. To restore to a given point-in-time, the snapshot and stored log files are transferred to the active file system. In a second embodiment, all log files associated with snapshots taken after the selected snapshot are also restored.

11 Claims, 11 Drawing Sheets

U.S. PATENT DOCUMENTS

| | | | |
|---|---|---|---|
| 6,799,189 B2* | 9/2004 | Huxoll | 707/204 |
| 2002/0049718 A1* | 4/2002 | Kleiman et al. | 707/1 |
| 2002/0083037 A1* | 6/2002 | Lewis et al. | 707/1 |
| 2002/0107877 A1* | 8/2002 | Whiting et al. | 707/204 |

OTHER PUBLICATIONS

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode file system*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

* cited by examiner

SYSTEM AND METHOD FOR CREATING A POINT-IN-TIME RESTORATION OF A DATABASE FILE

FIELD OF THE INVENTION

The present invention relates to databases and, more particularly to restoring a database from a archived copy.

BACKGROUND OF THE INVENTION

Microsoft® Exchange is a messaging and collaboration software system that provides a variety of applications for group interaction using networked computer systems. Specifically, Microsoft Exchange (by Microsoft Corp. of Redmond, Wash.) provides support for electronic mail (e-mail) over various networks. Specifically, the Exchange software provides an e-mail server to support remotely connected e-mail clients such as, e.g., Microsoft Outlook®. The Exchange software acts as a server for providing various functionalities to clients. An Exchange server can run on a variety of operating systems including, for example, the Microsoft Windows NT® or Microsoft Windows® 2000 operating systems.

In a typical configuration, Microsoft Exchange stores data associated with e-mail services in a series of three databases. In the particular example of Microsoft Exchange version 5.5, these three databases are named priv.edb, pub.edb and dir.edb. However, it is contemplated that other versions support different database structures. The default storage locations for these databases are on a disk locally connected to the computer on which the Exchange software is running. Specifically, the priv.edb file stores the actual e-mail messages received by the Exchange server. The pub.edb file tracks and stores the public folders associated with the electronic mail messages. The dir.edb file holds the topology of the various folders.

FIG. 1 shows a flow chart of an exemplary e-mail passing through an Exchange server. In step 105, the electronic mail is received via known e-mail processes. These processes can include the use of such protocols as the post office protocol (POP). Next, in step 110, the message is stored in the memory of the server. The storage of the message in memory is often transient in nature until the message is committed to some form on nonvolatile storage. The e-mail message is then written to a log file in step 115. The log files typically have a preallocated size. In one known example, each log file is 5 megabytes (MB) in size. Thus, an Exchange server may have a variable number of log files at any given point-in-time, depending on how many log files have been incorporated into the database files. Next, the log files are written to and incorporated into the database files, in step 120. The writing of the log file to database occurs in a lazy write fashion. By "lazy write" it is meant a writing process or procedure of the Exchange software that performs the write when central processing unit cycles are available. Thus, this lazy write proceeds mainly during off-peak times when the server is not being heavily utilized.

FIG. 2 is a schematic block diagram of an exemplary Exchange server environment 200. An exemplary server 205 executing the Microsoft NT operating system containing a local disk 210 is shown connected to a tape drive 220 and an external disk 215. The external tape drive 220 is connected via either a small computer system interface (SCSI) connection or a switching network, such as storage area network (SAN). Similarly, the external disks 215 may be connected via a SAN or other suitable networking architectures. The Exchange server 205 may be incorporated into a Microsoft Clustering System (MSCS) environment 225. Such a clustering environment provides for redundant data program access to clients.

In known examples of Exchange servers, the Exchange software provides an application program interface (API) that is accessible by other programs executing on the server for performing backup and restore operations on the various databases. Other applications or processes executing on the server can access these APIs to perform various backup/restore operations. These API's are targeted toward the use of tape drive as a backup storage device. Such backup operations are normally performed while the Exchange server is operating. As tape drives typically have a slower read/write time than disk drives, the backup of databases with a tape device can consume a significant amount of time. While the Exchange server is still operational during a backup operation, performance is degraded during the course of the backup operation. Due to the extended degradation caused by the use of tape devices a backup storage media, backups are typically performed at night (or other off-peak time), when few users are utilizing the system. Similarly, a restore operation using a tape device consumes a substantial amount of time to restore the databases. When performing a backup or restore operation, the database files and any unincorporated log need to be saved and/or restored. Thus as the size of the various database files increases, the time required to perform a backup/restore operation to a tape device also increases.

In a further known example, the Exchange server is adapted to have the database and log files preferably written to a local disk. However, by utilizing other software products such as, e.g. SnapManager® Data Migrator available from Network Appliance, Inc. of Sunnyvale, Calif., the log files and databases may be written to disks that are remotely connected to Exchange server. In one known implementation, the Exchange server is operatively interconnected with a file server and associated disk arrays, which provides file service for storage and access of the database and log files.

A file server is a computer that provides file service relating to the organization of information on storage devices, such as disks. The file server or filer includes a storage operating system that implements a file system to logically organize the information as a hierarchical structure of directories and files on the disks. By "file system" it is meant generally a structuring of data and metadata on a storage device, such as disks, which permits reading/writing of data on those disks. A file system also includes mechanisms for performing these operations. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system also available from Network Appliance, Inc. of Sunnyvale, Calif. The WAFL™ file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that implements file system semantics and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

A file server, as described above may be interconnected by a network to an Exchange or other database server to provide file service operations. In the example of an Exchange database server, the various database files can be stored on a set of disks interconnected with a file server through the use of such software programs as the above-described SnapManager software. As noted, such file servers typically utilize a tape device for backup/restore operations. A substantial amount of time is required to perform a backup operation to a tape device. Consequently, many system administrators do not frequently perform backup operations, thus preventing system performance degradation due to the ongoing backup operation. To restore a database to a particular point-in-time, the administrator typically requires a backup of the file system or database files generated at the desired point-in-time. As backups are typically written to tape devices with lengthy intervals between successive backups, the possible selection of discrete points-in-time to restore to is generally limited.

SUMMARY OF THE INVENTION

The disadvantages of the prior art are overcome by providing a method for creating a point-in-time restoration by utilizing a file system's capabilities to generate a snapshot of database files. When creating backups, a snapshot is taken of the database files associated with the database to be backed up. Additionally, any log files, which include data to be later incorporated into the database files, are copied into a special directory on the active file system. These snapshots can be taken in seconds, thereby allowing multiple backups per day to be created of the database files.

If the database files become corrupted, two alternative procedures are available for restoring from the snapshot backups. The first is for the user or administrator to select one of the snapshot backups and to restore to that point. In this first embodiment, the database server is taken offline, the snapshot is restored to the active file system, replacing the corrupted files. The log files are also moved from the backup directory to the active file system. Thus, the database is restored to a certain point-in-time. Due to the nature of restorations using snapshots, these restorations are accomplished quickly with little database/server downtime.

In a second embodiment, the user or administrator selects a given snapshot backup. After the database server is deactivated, the selected snapshot is restored to the active file system. Any log files associated with that selected snapshot are also restored. Additionally, any log files associated with newer snapshots are restored to the active file system. By restoring later created log files, more data can be successfully restored and data loss is prevented.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Network Environment

Figure 1:
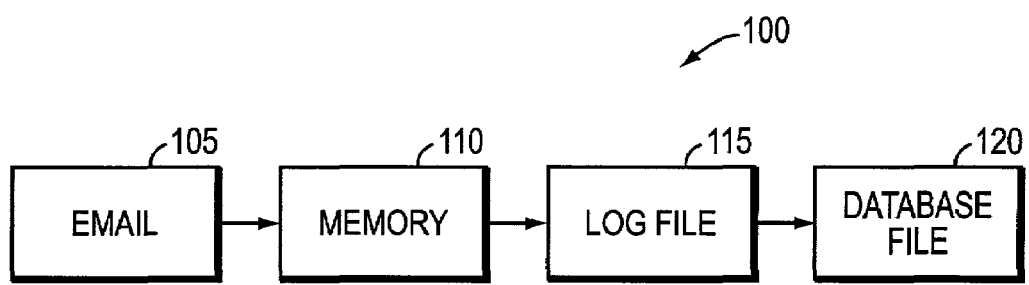
FIG. 1, already described, is a flow chart detailing the steps that an electronic message follows in accordance with an Exchange server according to the prior art.
Figure 2:
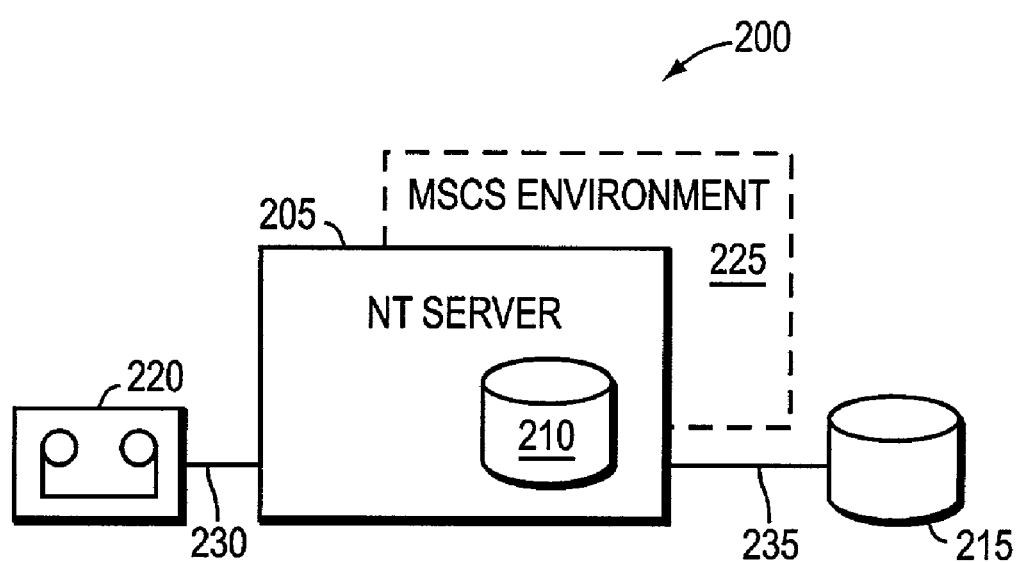
FIG. 2, already described, is a schematic block diagram of an exemplary Microsoft® NT server executing Exchange having an external disk and tape drive according to the prior art.
Figure 3:
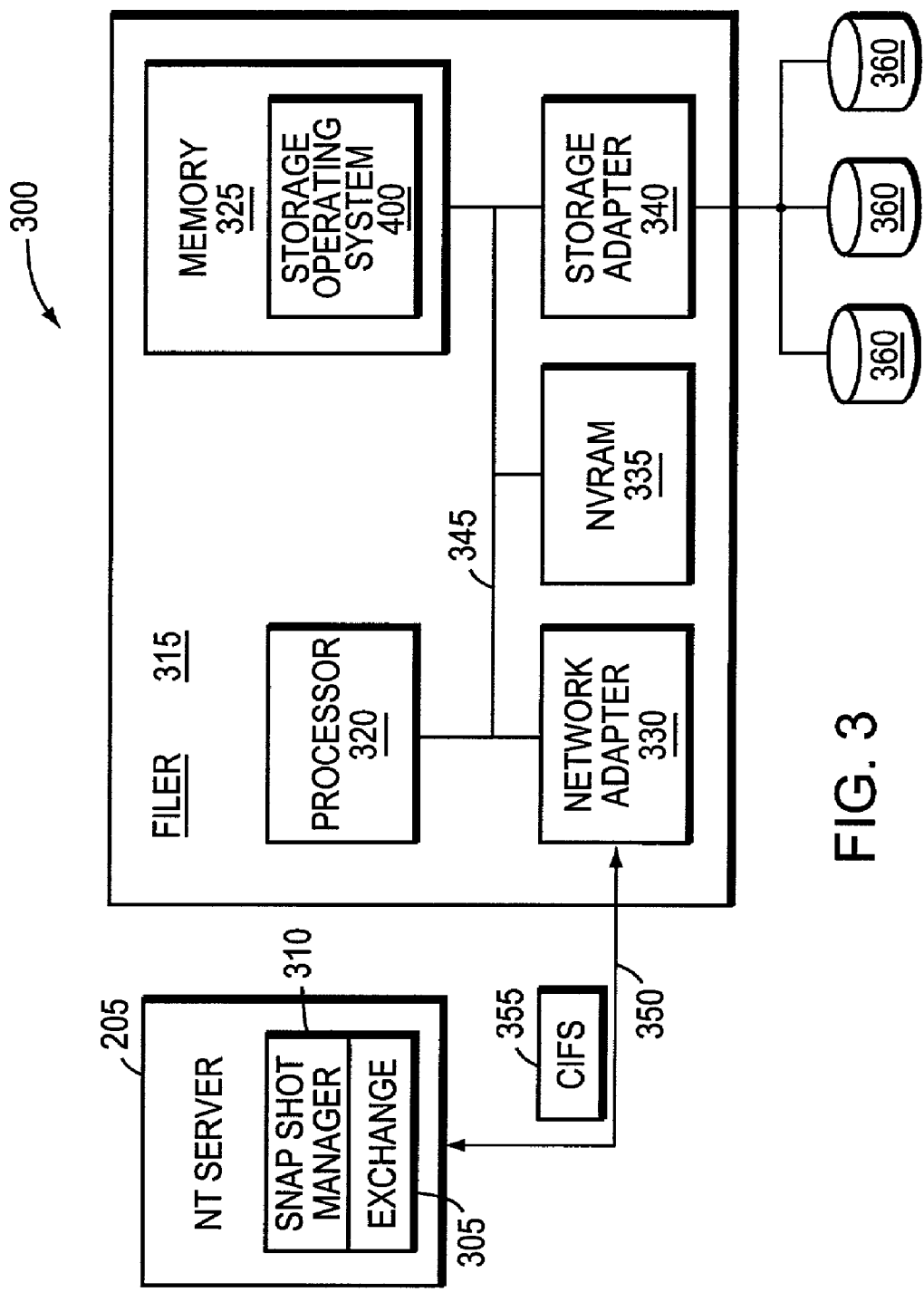
FIG. 3 is a schematic block diagram of an exemplary Exchange server and file server in accordance with an illustrative embodiment of this invention.

By way of further background, FIG. 3 is a schematic block diagram of a storage system environment 300 that includes a client 205 having one or more applications, including a Microsoft Exchange server 305 and a snapshot manager 310, and an interconnected file server 315 that may be advantageously used with the present invention. The snapshot manager 310 is a general-purpose application that handles snapshot creation and handling functions within the server. One example is the above-referenced Network Appliance SnapManager software. The snapshotting process is described, in further detail in U.S. patent application Ser. No. 09/932,578 entitled INSTANT SNAPSHOT by Lewis et al.

The filer server or "filer" 315 is a computer that provides file service relating to the organization of information on storage devices, such as disks 360. It will be understood to those skilled in the art that the inventive technique described herein may apply to any type of special-purpose computer (e.g., server) or general-purpose computer, including a standalone computer. The filer 315 comprises a processor 320, a memory 325, a network adapter 330 and a storage adapter 340 interconnected by a system bus 345. The filer 315 also includes a storage operating system 400 (FIG. 4) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, filer 315 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 325 comprises storage locations that are addressable by the processor and adapters for storing software program code. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The operating system 400, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 330 comprises the mechanical, electrical and signaling circuitry needed to connect the filer 315 to an Exchange or database server 205 over a computer network 350, which may comprise a point-to-point connection or a shared medium, such as a local area network. The database server 205 may be a general-purpose computer configured to execute applications 305, such as a database application, for example Exchange. Moreover, the client may interact with the filer 315 in accordance with a client/server model of information delivery. That is, the client may request the services of the filer, and the filer may return the results of the services requested by the client, by exchanging packets 355 encapsulating, e.g., the CIFS protocol or NFS protocol format over the network 350.

The storage adapter 340 cooperates with the operating system 400 (FIG. 4) executing on the filer to access information requested by the client. The information may be stored on the disks 360 that are attached, via the storage adapter 340 to the filer 315 or other node of a storage system as defined herein. The storage adapter 340 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 320 (or the adapter 340 itself) prior to being forwarded over the system bus 345 to the network adapter 330, where the information is formatted into a packet and returned to the server 205.

In one exemplary filer implementation, the filer 315 can include a nonvolatile random access memory (NVRAM) 335 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 360 are arranged into a plurality of volumes, each having a file system associated therewith. The volumes each include one or more disks 360. In one embodiment, the physical disks 360 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

To facilitate generalized access to the disks 360, the storage operating system 400 (FIG. 4) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the storage operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 4:
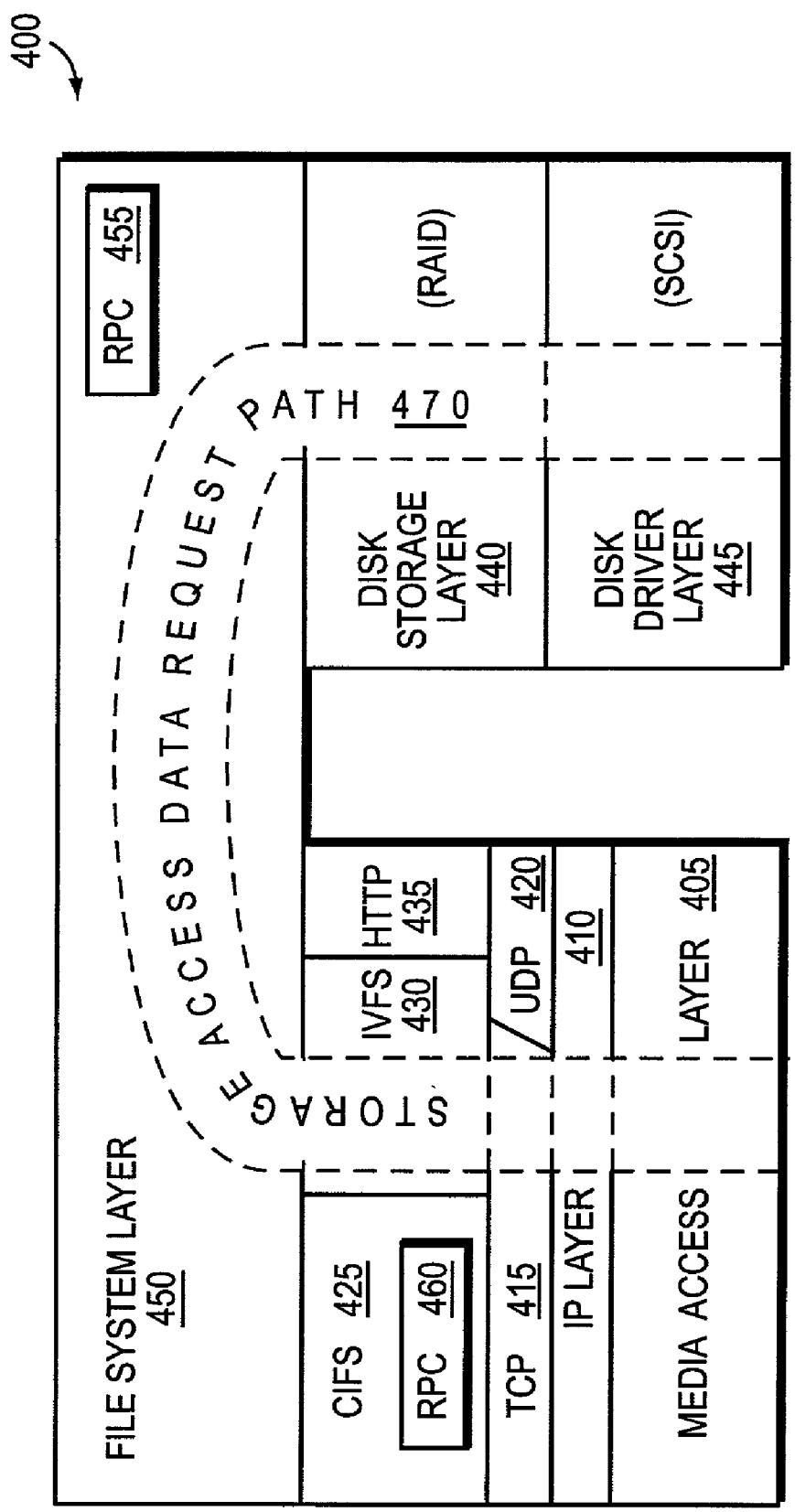
FIG. 4 is a schematic block diagram of an exemplary storage operating system for use on the file server of FIG. 3.

The organization of the preferred storage operating system for the exemplary filer is now described briefly. However, it is expressly contemplated that the principles of this invention can be implemented using a variety of alternate storage operating system architectures. As shown in FIG. 4, the storage operating system 400 comprises a series of software layers, including a media access layer 405 of network drivers (e.g., an Ethernet driver). The operating system further includes network protocol layers, such as the Internet Protocol (IP) layer 410 and its supporting transport mechanisms, the Transport Control Protocol (TCP) layer 415 and the User Datagram Protocol (UDP) layer 420. A file system protocol layer provides multi-protocol data access and, to that end, includes support for the CIFS protocol 425, the NFS protocol 430 and the Hypertext Transfer Protocol (HTTP) protocol 435. The CIFS layer 425 includes support for remote procedure calls (RPC) 460. RPCs permit an application executing on another computer to remotely call various functions via a CIFS data packet. Such remote functions, described further below, include e.g., taking a snapshot of a file system of a volume. In addition, the storage operating system 400 includes a disk storage layer 440 that implements a disk storage protocol, such as a RAID protocol, and a disk driver layer 445, that implements a disk control protocol such as the small computer system interface (SCSI).

Bridging the disk software layers with the network and file system protocol layers is a file system layer 450 of the storage operating system 400. Generally, the layer 450 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 325. If the information is not in memory, the file system layer 450 indexes into the inode file using the inode number to access an appropriate entry and retrieve a logical volume block number. The file system layer 450 then passes the logical volume block number to the disk storage (RAID) layer 440, which maps that logical number to a disk block number and sends the latter to an appropriate driver (for example, an encapsulation of SCSI implemented on a fibre channel disk interconnection) of the disk driver layer 445. The disk driver accesses the disk block number from volumes and loads the requested data in memory 325 for processing by the filer 315. Upon completion of the request, the filer (and storage operating system) returns a reply, e.g., a conventional acknowledgement packet 355 defined by the Common Internet File System (CIFS) specification, to the server 205 over the network 350. Similar to the CIFS layer 425, the file system layer 450 includes support for various remove procedure calls (RPC) 455.

It should be noted that the software "path" 470 through the storage operating system layers described above needed to perform data storage access for the client request received at the filer may alternatively be implemented in hardware or a combination of hardware and software. That is, in an alternate embodiment of the invention, the storage access request data path 470 may be implemented as logic circuitry embodied within a field programmable gate array (FPGA) or an application specific integrated circuit (ASIC). This type of hardware implementation increases the performance of the file service provided by filer 315 in response to a file system request packet 355 issued by the database server 205.

C. Backup Operations

To be able to effectively create point-in-time restorations of database files, the database files should be regularly backed up. By "point-in-time restoration" it is meant a restoration associated with a particular backup or snapshot that was generated at a particular time. As noted above, prior or other implementations typically only perform a backup operation during the evening (or other off-peak time) due to system performance degradation caused by the backup operation. By storing the database files on a file server, faster backups can be accomplished using, e.g., a file server's inherent snapshot capabilities provided by the snapshot manager 310. By "snapshot" it is meant generally a rapid generation of an image of the data at a certain point-in-time. While this descriptions is written in terms of the methodology utilized by Network Appliance, Inc. in generating Snapshots™, it is expressly contemplated that other methodologies of creating snapshots or other duplicated copies can be utilized in accordance with the teachings of the present invention. Snapshots, described further below, can be generated using a variety of techniques.

Figure 5:
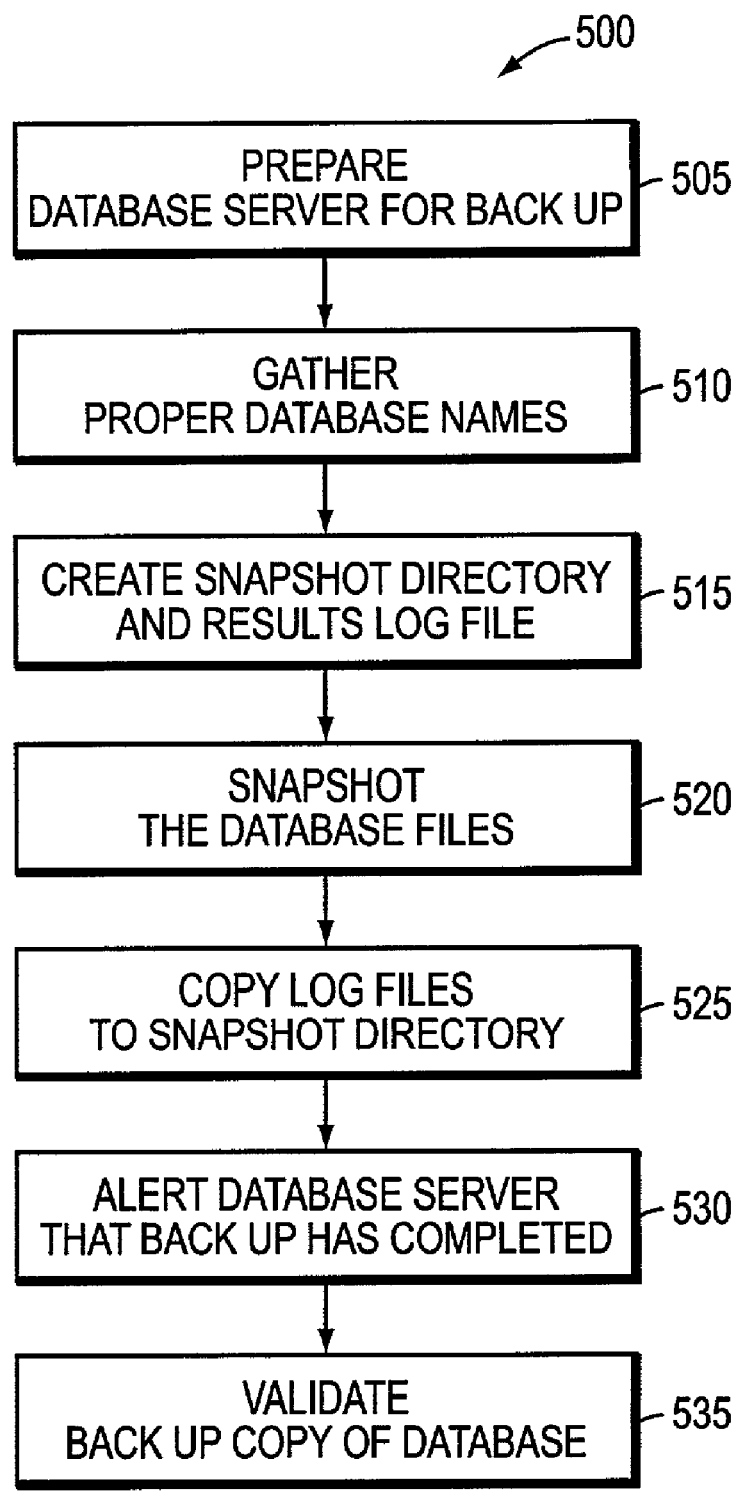
FIG. 5 is a flow chart detailing the steps of the procedure performed in comparing a backup and snapshot in accordance with the embodiment of this invention.

FIG. 5 is a flow chart detailing a procedure 500 performed by a backup software executing on the database server (specifically, an Exchange server in this illustrative embodiment). The software executing on the database server utilizes an application program interface, various remote procedure calls (RPC) or an rshell over the network connection between the database server and the file server to cause the file server to perform various functions. An RPC or rshell permits the backup process executing on the database server to execute commands on the file server. The APIs permit an application program executing on a remote computer to cause the file server to execute certain operations. In step 505, the backup process prepares the database server for backing up. This preparation can include, for example, stopping the lazy write of log files into the database files. By stopping the lazy write, the database files and log files are in a consistent state during the course of the backup operation. In step 510, the process then gathers the proper database names. This gathering of proper database names includes, for example, determining what volume the database files are stored on and what, if any, unique names are associated with the database files. The process then, in an illustrative embodiment, utilizes an API call to the file server to create a snapshot directory and results log file on the filer (step 515). Next, in step 520, the process utilizes a RPC or rshell to cause the file server to take a snapshot of the database files.

The log files associated with the database are then copied into the snapshot directory (step 525). As the log files are typically small (on the order of 5 MB), they can be quickly copied. In step 530, the process then alerts the database server that the backup operation has completed. After the database server has been alerted to the completion of the backup operation, it proceeds with normal operations, including, e.g. lazy writes of log files to databases. Then, in step 535, the process performs a validation of the backup copy of the database. If the database passes this validation check, it is marked as an acceptable backup for use for a restoration. If this optional validation step is not performed, the backup will be validated prior to its use in restoring files therefrom (see step 810 in FIG. 8).

Generally a snapshot is an image of a file system at a point in time which is stored on the same primary storage device as is the active file system and is accessible by users of the active file system. By "active file system" it is meant the file system to which current input/output operations are being directed. The primary storage device, e.g., a set of disks, stores the active file system, while a secondary storage, e.g. a tape drive, may be utilized to store backups of the active file system.

Figure 6A:
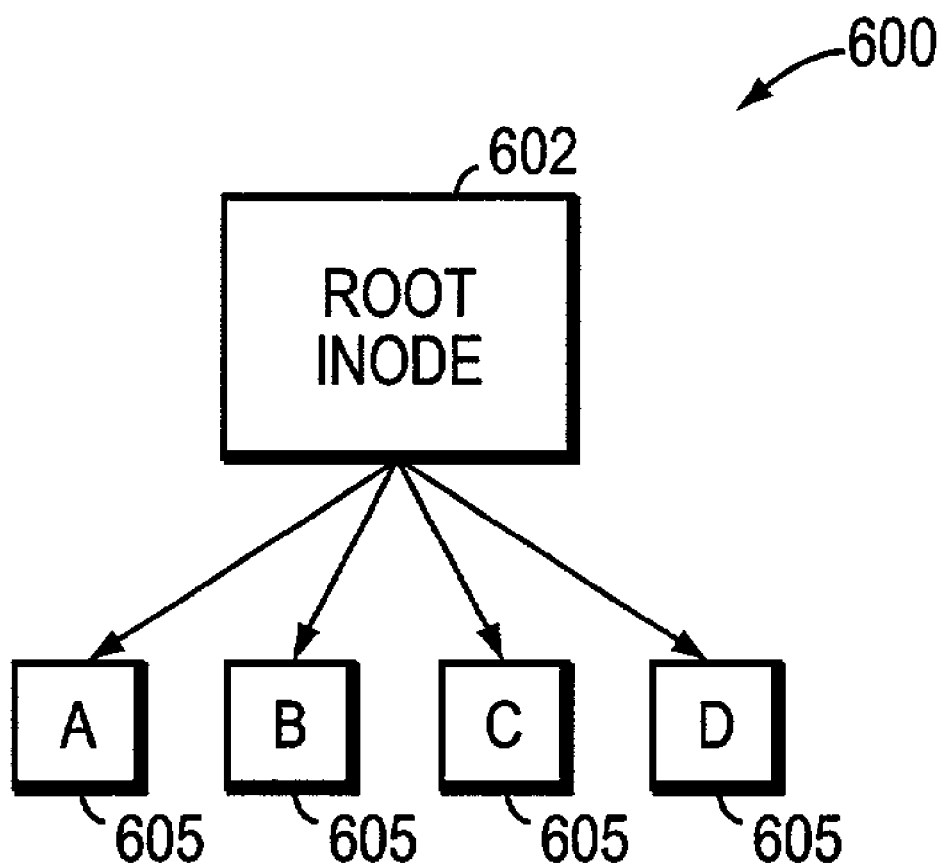
FIG. 6a is a schematic block diagram of an exemplary active file system and inodes.
Figure 6B:
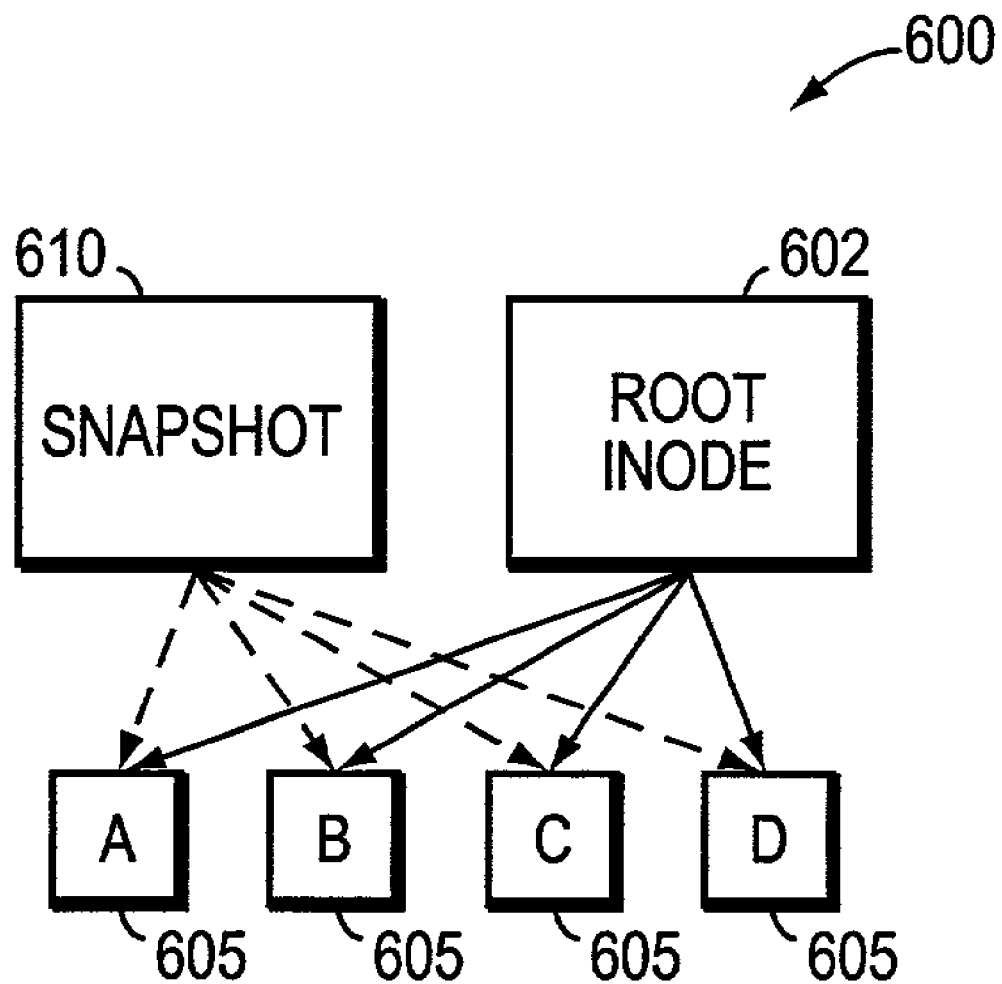
FIG. 6b is a schematic block diagram of an exemplary file system with snapshot and inodes.
Figure 6C:
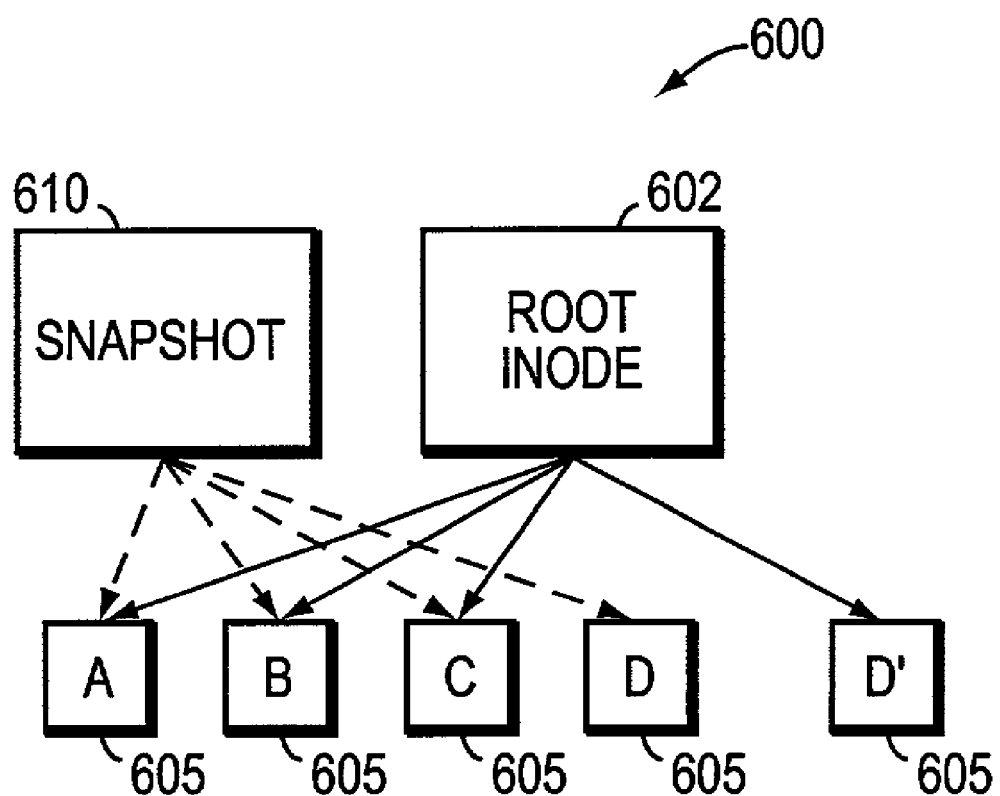
FIG. 6c is a schematic block diagram of an exemplary file system showing inodes in an updated data block.

FIG. 6a shows an exemplary root inode 602 of an active file system 600 linking four inodes 605. Note that the active file system would include additional data structures and blocks (not shown) such as a file system information block defining the root of the active file system. In accordance with the illustrative embodiment, the active file system 600 includes a root inode linking to the various inodes 605 that contain the data associated with a file or directory. In FIG. 6b a conventional snapshot 610 has been taken of the root inode 602. As can be seen, the snapshot 610 includes a link to each of the inodes 605. FIG. 6c shows the snapshotted root inode after data inode D has been modified into D'. Thus, the snapshot 610 provides links to data inodes A-D, which represent the state of the data at the time of the snapshot. The root inode 602 which now represents the modified root inode, links to unmodified data inodes A-C and the modified inode D'.

D. Point-in-Time Restoration

Figure 7:
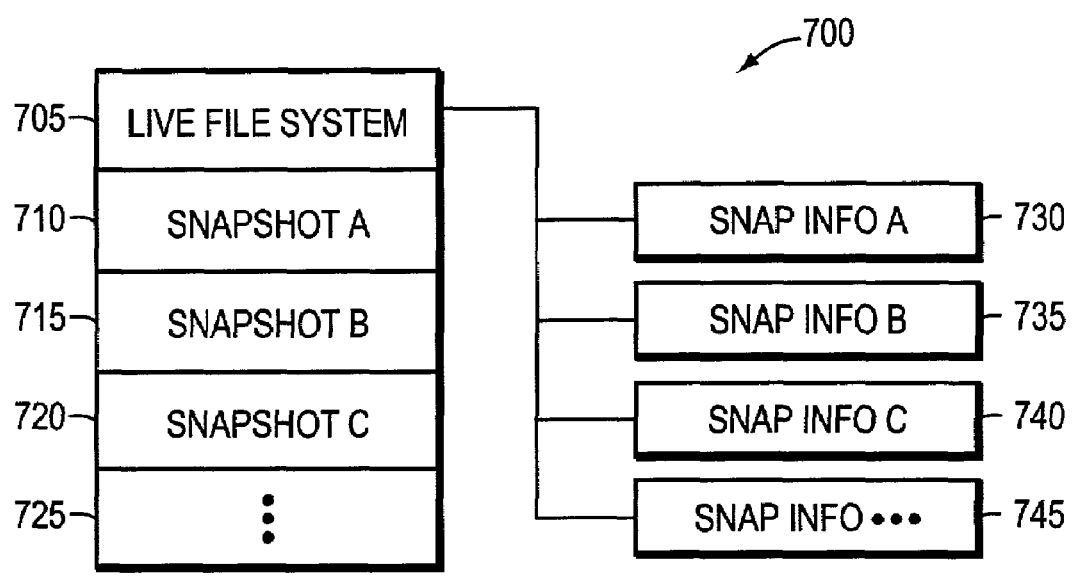
FIG. 7 is a block diagram of an active file system and associated snapshots.

FIG. 7 is a schematic block diagram of an exemplary file system 700 showing the current live file system and associated snapshots and snapinfos, described further below. The live file system 705 is made up of the active file system of the file server. Any current input/output (I/O) operations are performed to this live file system. Shown connected to the live file system are a series of snapshots, including snapshot A 710, snapshot B 715 and snapshot C 720. Additional snapshots 725 may also be connected with the live file system 705. Each of the snapshots 710-725, are the result of an above-described snapshot operation. In known implementations of storage operating systems, a number of time-ordered snapshots can be accommodated with respect to a file system. As part of the live file system 705, a number of snapinfos 730-745 are connected. Each snapinfo is associated with a corresponding snapshot of the file system or database files. The snapinfo carries meta data of the snapshot including, for example the time the snapshot was performed, the results of the snapshot and any log files generated from the snapshot. The snapinfo is stored on the live file system 705, typically in a subdirectory or directory of the file system.

If, for example, snapshots are taken of the database files at a regular interval, snapshots 710-725 would represent the last several snapshots of the database information. For example, if snapshots were taken at 4-hour increments, snapshot A corresponds to the most recent snapshot. Thus, snapshot A 710 would contain an image of the database files that is no older than 4 hours.

According to an illustrative embodiment, the database files can be restored from any validated backup. Thus, any snapshot of the database files can be used as a basis for restoring the database files. Two embodiments of the point-in-time restoration method are described. The first embodiment restores from a selected snapshot and related log files. The second embodiment restores from a selected snapshot, related log files and all log files newer than the selected snapshot.

Figure 8:
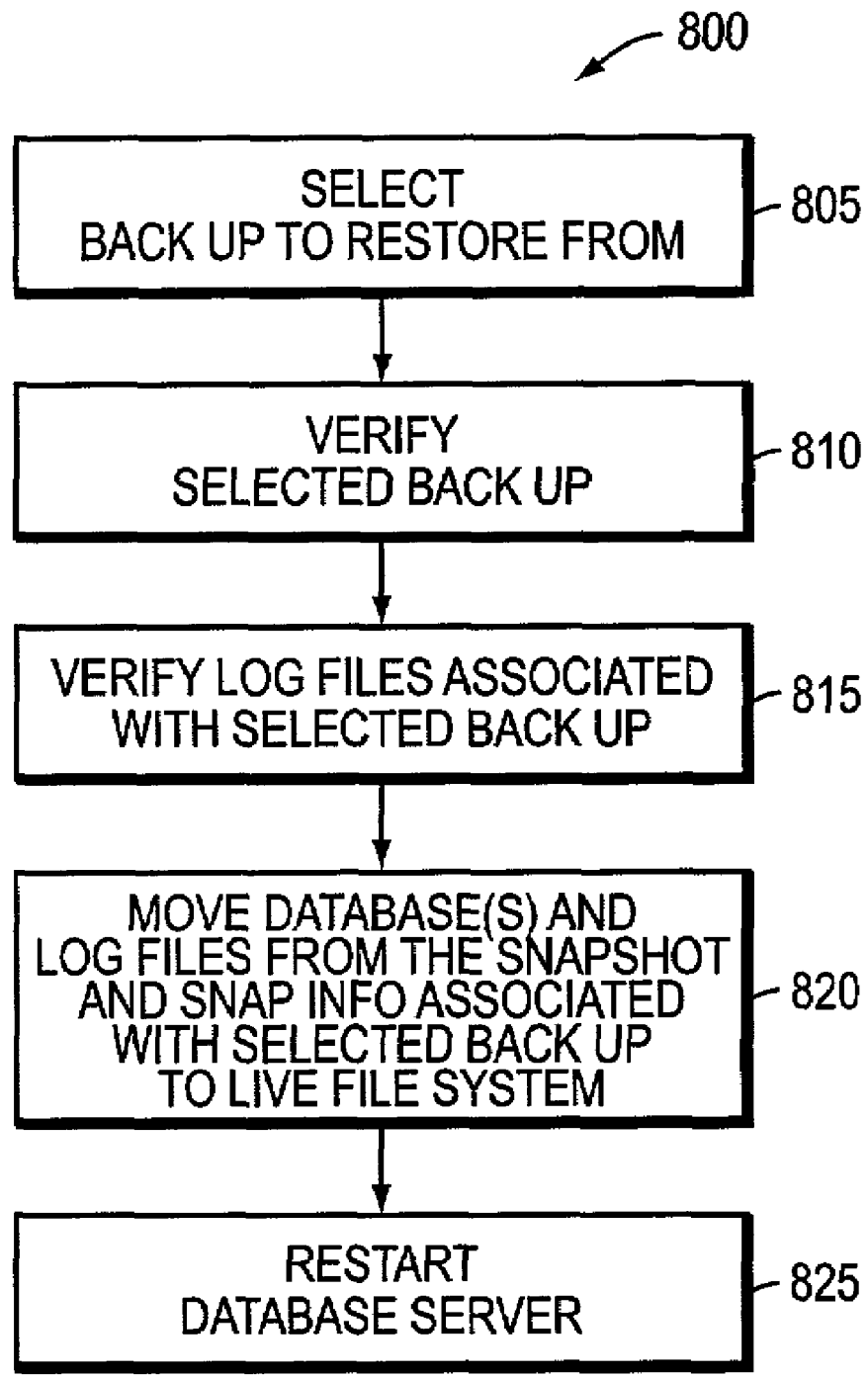
FIG. 8 is a flowchart detailing the procedure performed when restoring from a backup.

FIG. 8 is a flow chart detailing the procedure 800 performed in restoring the database files from a validated backup in accordance with the first embodiment of the invention. This procedure is performed after the database server has been taken off-line so that new data is not being written to into the database files. In step 805, the user selects the backup to restore from. This selection can occur via a command entered on a command line interface (CLI), or via an option selected from a graphical user interface (GUI) or any other input methodology. Once the backup to restore from has been selected, in step 810, the selected backup is verified. This verification ensures that the database files contain within the snapshot information are not corrupted and are valid. If the selected backup was previously verified when it was created (see step 535 of FIG. 5), the backup is not re-verified. Instead, a determination is made whether the previous verification was successfully completed. Next, in step 815, the log files associated with the selected backup are verified. These log files, stored in the snapinfo, are checked to ensure that they are not corrupt and that they are in a valid format. The databases from the snapshot and the log files associated with the selected backup, which are stored in the snapinfo, are moved to the live file system (step 820). When these log files are moved to the active file system, they are renamed in accordance with a preferred naming scheme utilized by the database server. In an illustrative embodiment, Microsoft Exchange requires that the most recent log file be named "edb.log," with each preceding log file named "edbXXXXX.log" The "XXXXX" is a numerical identifier associated with the particular log file. Finally, in step 825, the database server is restarted. Once the database server has restarted, the restoration is complete.

Figure 9:
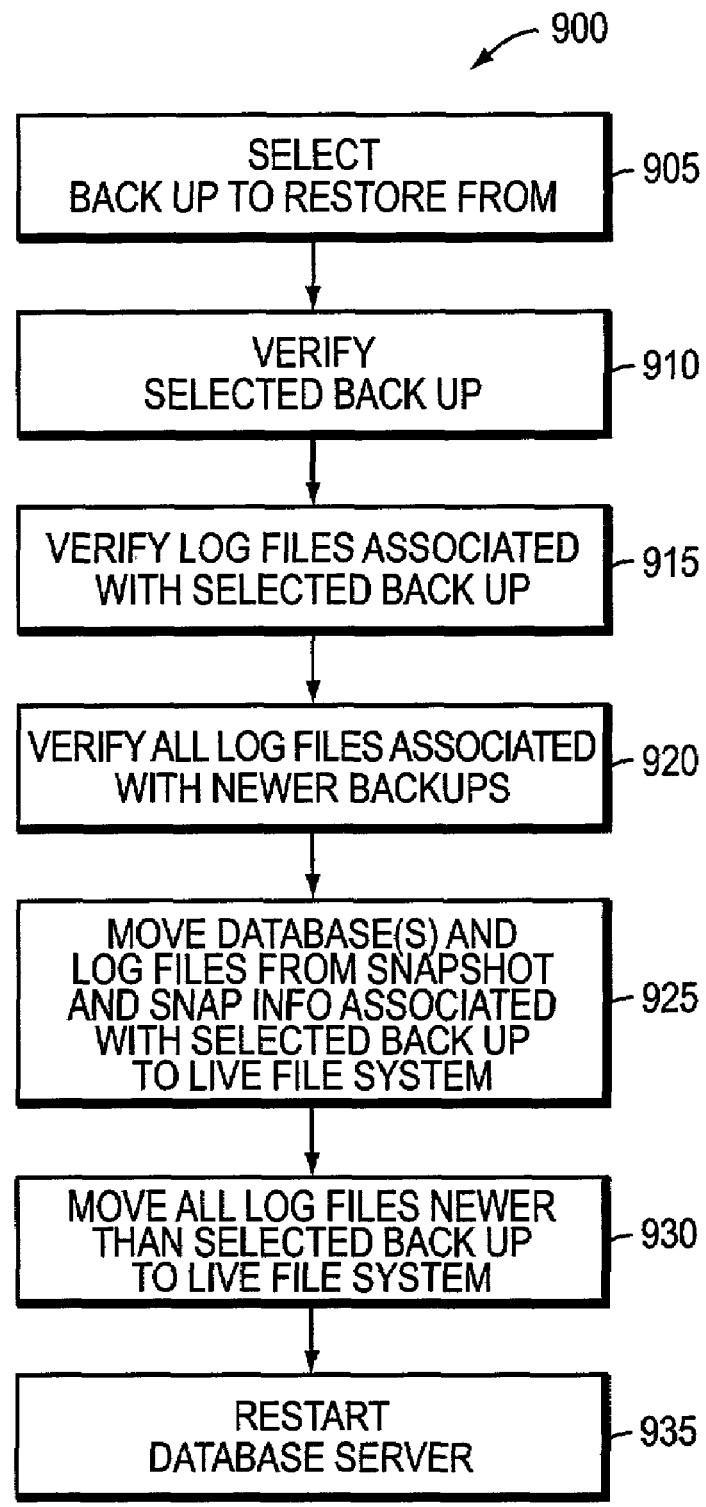
FIG. 9 is a flowchart detailing the procedure performed when playing back all logs after a selected backup in accordance with an embodiment of this invention.

FIG. 9 is a flow chart detailing the procedure 900 performed by the process to restore a validated backup and all newer log files in accordance with the second embodiment of the invention. This process is performed by the process after the database server has been taken off-line. In step 905 the user or administrator selects a backup to restore from. This backup should include both the actual backup or snapshot to restore from. Next, in step 910, the selected backup is verified. Similarly to step 810 (FIG. 8), if the backup was verified when created, a check is performed that the previous verification was successfully performed. Then, in step 915 the log files associated with the selected backup are verified. Additionally, all the log files associated with all backups that are newer than the selected backup are verified (step 920). Then, in step 925, the databases and log files from the snapshot and snapinfo associated with the selected backup are moved to the live file system. Then, all log files newer than the selected backup are moved to the live file system (step 930). Similar to the process described with reference to FIG. 8, the log files are renamed into the appropriate naming convention required by the database software after being moved to the active file system. After the newer log files are moved to the live file system, the database server is restarted (step 935).

To again summarize, by utilizing the snapshot capabilities of a file server storing the database files and associated log files, multiple backups can be generated with little or no system degradation. During each snapshot operation, a snapshot of each of the file systems containing the database files is generated. A special directory, arbitrarily called snapinfo, on the active file system is also created to store backup copies of any log files associated with the database that have not yet been incorporated into the database files. A copy of any log file is created in this directory.

Restoration of the database files can be accomplished by either selecting a particular snapshot and restoring from that snapshot and associated log files or by restoring from a selected snapshot and all log files that are newer than the selected snapshot. The selected snapshot is moved to the active file system by copying the contents of the snapshot inode to the root inode associated with the volume containing the snapshot. The log files are copied from the special snapinfo directory to the active file system. These log files are then renamed in accordance with the preferential naming system utilized by the database server.

The foregoing has been a detailed description of an illustrative embodiment of the invention. Various modifications and additions can be made without departing from the spirit and scope of the invention. It is understood that other database servers and database files can be utilized in accordance with the teachings of this invention while remaining within the scope of the present invention. In addition, while this reference has been written with reference to the Microsoft® Exchange server and file servers and filers, the principles are equally pertinent to all types of computers, including stand-alone computers. In addition, it is specifically contemplated that the teachings of this invention can be applied to other versions of Exchange that are not inherently disadvantaged with respect to remote backup to file servers. Further, it is expressly contemplated that the teachings of this invention can be implemented as software, including a computer-readable medium having program instructions executing on a computer, hardware, firmware, or a combination thereof. Accordingly this description is to only be taken by way of example and not to otherwise limit the scope of the invention.

What is claimed is:

1. A method for generating a point-in-time restoration of a database to an active file system, comprising:
    storing a first snapshot, the first snapshot taken at a first time, the first snapshot including a set of database files;
    storing a copy of a first log file, the copy of the first log file associated with the first snapshot, the copy of the first log file including information that had not yet been incorporated into the database files as of the first time;
    storing a copy of a second log file, the copy of the second log file associated with a second snapshot taken at a second time subsequent to the first time, the copy of the second log file including information received subsequent to the first time that had not yet been incorporated into the database files as of the second time; and
    copying the first snapshot, the copy of the first log file, and the copy of the second log file to the active file system, to thereby restore at least a portion of the information received at the database subsequent to the first time without using the second snapshot.

2. The method of claim 1 further comprising:
    verifying that the first snapshot, the copy of the first log file, and the copy of the second log file are not corrupted and are valid.

3. The method of claim 1 wherein the step of copying further comprises:
    copying contents of a root inode associated with the snapshot to a root inode associated with the active file system.

4. The method of claim 1 wherein the step of copying further comprises:
    renaming the copy of the first log file and the copy of the second log file according to a naming convention of the database such that the first log file and the second log file are recognized by the database.

5. The method of claim 1 wherein the copy of the first log file and the copy of the second log file are stored in directories of the active file system, the directories also storing meta data associated with the snapshots.

6. A system for generating a point-in-time restoration of a database to an active file system, the system comprising:
    a storage device configured to store a first snapshot, the first snapshot taken at a first time, the first snapshot including a set of database files, the storage device further configured to store a copy of a first log file, the copy of the first log file associated with the first snapshot, the copy of the first log file including information that had not yet been incorporated into the database files as of the first time, the storage device also configured to store a copy of a second log file, the copy of the second log file associated with a second snapshot taken at a second time subsequent to the first time, the copy of the second log file including information received subsequent to the first time that had not yet been incorporated into the database files as of the second time; and
    a processor configured to copy the first snapshot, the copy of the first log file, and the copy of the second log file to the active file system, to thereby restore at least a portion of the information received at the database subsequent to the first time without using the second snapshot.

7. The system of claim 6 wherein the processor is further configured to verify that the first snapshot, the copy of the first log file, and the copy of the second log file are not corrupted and are valid.

8. The system of claim 6 wherein the processor is further configured to copy contents of a root inode associated with the snapshot to a root inode associated with the active file system.

9. The system of claim 6 wherein the processor is further configured to rename the copy of the first log file and the copy of the second log file according to a naming convention of the database such that the first log file and the second log file are recognized by the database.

10. The system of claim 6 wherein the copy of the first log file and the copy of the second log file are stored in directories of the active file system, the directories also storing meta data associated with the snapshots.

11. A computer readable medium containing executable program instructions for generating a point-in-time restoration of a database to an active file system, the executable program instructions comprising program instructions adapted for:

storing a first snapshot, the first snapshot taken at a first time, the first snapshot including a set of database files;

storing a copy of a first log file, the copy of the first log file associated with the first snapshot, the copy of the first log file including information that had not yet been incorporated into the database files as of the first time;

storing a copy of a second log file, the copy of the second log file associated with a second snapshot taken at a second time subsequent to the first time, the copy of the second log file including information received subsequent to the first time that had not yet been incorporated into the database files as of the second time; and copying the first snapshot, the copy of the first log file, and the copy of the second log file to the active file system, to thereby restore at least a portion of the information received at the database subsequent to the first time without using the second snapshot.

* * * * *